United States Patent [19]

Kanao

[11] 4,343,672

[45] Aug. 10, 1982

[54] METHOD AND APPARATUS FOR PRODUCING TUBE

[76] Inventor: Shiro Kanao, 32-460, Nanpeidai, Takatsuki-shi, Osaka-fu, Japan

[21] Appl. No.: 219,275

[22] Filed: Dec. 22, 1980

Related U.S. Application Data

[63] Continuation of Ser. No. 776,033, Mar. 9, 1977, abandoned.

[30] Foreign Application Priority Data

May 14, 1976 [JP] Japan .................................. 51-55605
May 14, 1976 [JP] Japan .................................. 51-55608

[51] Int. Cl.$^3$ ............................................... B31C 1/00
[52] U.S. Cl. .................... 156/428; 156/143; 156/195; 156/244.15; 156/430
[58] Field of Search ............... 156/195, 425, 428–432, 156/244.15, 143–144

[56] References Cited

U.S. PATENT DOCUMENTS

| | | | |
|---|---|---|---|
| 3,532,580 | 10/1970 | Kanao | 156/428 X |
| 3,890,181 | 6/1975 | Stent et al. | 156/195 X |
| 3,910,808 | 10/1975 | Steward | 156/429 |
| 3,997,382 | 12/1976 | Tanaka | 156/244.15 X |

FOREIGN PATENT DOCUMENTS

| | | | |
|---|---|---|---|
| 542077 | 6/1957 | Canada | 156/428 |
| 1196075 | 6/1970 | United Kingdom | 156/428 |

*Primary Examiner*—David A. Simmons
*Attorney, Agent, or Firm*—Edwin E. Greigg

[57] ABSTRACT

A method and an apparatus for producing a tube from a strip of synthetic resin and/or unvulcanized rubber incorporating a vulcanizing agent by winding the strip on a former supported by a frame in the manner of a cantilever to shape the strip into a tubular body and heating the tubular body on the former by a heater while sending out the tubular body toward the free end of the former.

17 Claims, 16 Drawing Figures

METHOD AND APPARATUS FOR PRODUCING TUBE

This is a continuation, of application Ser. No. 776,033 filed Mar. 9, 1977, now abandoned.

BACKGROUND OF THE INVENTION

The present invention relates to a method of and an apparatus for continuously producing a tube of indefinite length from synthetic resin and/or unvulcanized rubber incorporating a vulcanizing agent.

With conventional techniques, tubes are produced from synthetic resin and/or unvulcanized rubber incorporating a vulcanizing agent by a batchwise operation including two separate steps; the step of shaping a tubular body and the step of placing the tubular body into a vulcanizer and heating the tubular body for vulcanization. Accordingly, the operation is inefficient and involves difficulty in producing elongated tubes because the length of the tube to be produced is limited by the dimensions of the vulcanizer. Further when tubes are shaped from synthetic resin, the step of helically winding an extruded strip into a tubular body has the drawback that the adjacent superposed coils of the strip are not completely intimately fused and bonded to each other due to a reduction in temperature. Alternatively, when such strip is wound in layers into a tubular body, the adjacent layers are not always fully intimately fused and bonded to each other.

This invention has overcome such problems.

SUMMARY OF THE INVENTION

This invention provides a method of producing a tube comprising the continuous steps of extruding synthetic resin and/or unvulcanized rubber incorporating a vulcanizing agent into a strip, helically winding the strip on a former into a tubular body, and heat-treating the tubular body as retained on the former.

This invention further provides an apparatus for producing such tube comprising a former supported by a frame in the manner of a cantilever for helically winding thereon a strip of synthetic resin and/or unvulcanized rubber incorporating a vulcanizing agent to shape the strip into a tubular body and send out the tubular body toward the free end of the former, and heating means for heat-treating the tubular body retained on the former.

According to the method and apparatus of this invention, a tubular body is shaped on the former and heat-treated thereon at the same time. When the tubular body is made from unvulcanized rubber, therefore, the coils of the strip forming the tubular body can be fused and bonded together effectively and the tubular body can be immediately vulcanized by a continuous operation. The heat treatment ensures more effective fusion and bonding between the coils of the strip when it is made of synthetic resin, making it possible to continuously produce a tube of improved durability.

An object of this invention is to provide a method of and an apparatus for producing a durable tube by continuously heat-treating an elongated tubular body of unvulcanized rubber and/or synthetic resin.

Another object of this invention is to heat-treat a tubular body from inside as it is retained on a former to thereby achieve improved vulcanizing effect and ensure effective fusion and bonding between coils of a strip.

Another object of this invention is to render the helical pitch of feed rollers freely settable so that a strip can be wound into a tubular body with an adjustable degree of lapping.

Other objects and advantages of this invention will become apparent from the following description.

Embodiments of the invention will be described below in detail with reference to the accompanying drawings showing an embodiment of the present apparatus and examples of hoses produced by the present method and apparatus.

BRIEF DESCRIPTION OF THE DRAWINGS

FIGS. 5 (A) and (B) are side elevations in vertical section showing another principal part;

DESCRIPTION OF THE PREFERRED EMBODIMENTS

Figure 1:
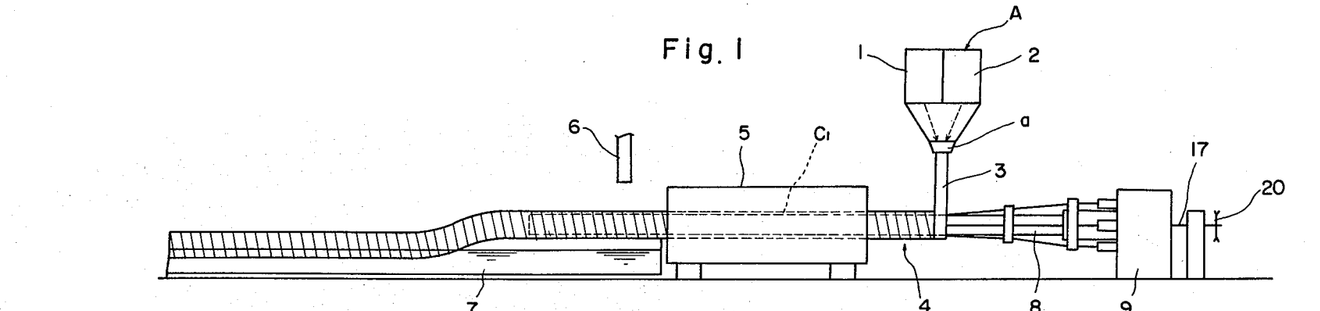
FIG. 1 is a front view schematically showing an apparatus for producing a reinforced rubber hose.

FIG. 1 shows an extruder A for continuously extruding a strip 3 onto a former B supported in the manner of a cantilever. The strip 3 is composed of unvulcanized rubber 1 incorporating a vulcanizing agent and a reinforcement 2 of rigid polyvinyl chloride resin embedded in a thick portion of the rubber 1. Within the extruder A, the unvulcanized rubber 1 is maintained at up to about 60° C. and the reinforcement 2 at about 130° to 180° C. The strip 3 is maintained at about 100° C. when extruded from a die a into the atmosphere. The unvulcanized rubber 1 used has good compatibility with rigid polyvinyl chloride resin. Due to the application of heat for the extrusion, the unvulcanized rubber 1, when extruded into the strip 3, has greater toughness than at the atmospheric temperature and is intimately fused and bonded to the reinforcement 2 at the interface therebetween.

The former B is so constructed as to helically wind the strip 3 into a tubular body 4 with its one edge lapping over the other edge while sending out the tubular body 4 toward the free end of the former B. The former B incorporates heating means $C_1$ and is provided therearound with a heating chamber 5 housing heating means $C_2$ utilizing infrared ray lamps. The heating chamber 5 is disposed at an intermediate portion of the length of the former B. The tubular body 4 sent forward while being retained in shape by the former B is continuously vulcanized by being heated to 170° to 220° C. from both inside and outside by the heating means $C_1$ and $C_2$. The portion of the former B extending from the heating chamber 5 toward its free end does not include the heating means $C_1$ but is provided with a cooling water discharge nozzle 6 close to its outer periphery. Indicated at 7 is an elongated water bath.

Figure 6:
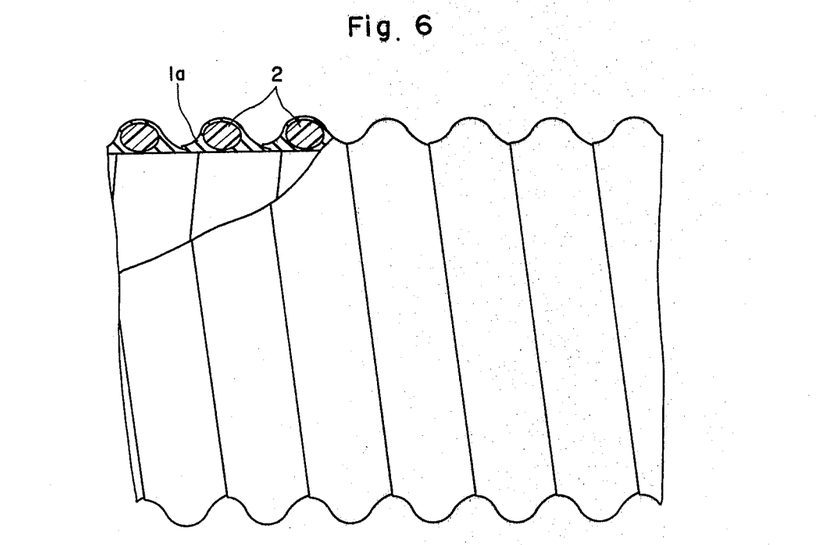
FIG. 6 is a front view partly broken away and showing the reinforced rubber hose.

Accordingly, the heated and vulcanized tubular body 4 is cooled with the cooling water from the nozzle 6 and is further cooled to the atmospheric temperature by the water bath 7 while floating and traveling thereon, whereby the reinforcement 2 is hardened. Consequently, a reinforced rubber hose is obtained which is composed of a rubber layer 1a and a helical reinforcement 2 embedded in a thick portion of the rubber layer as shown in FIG. 6.

The reinforcement 2 and the unvulcanized rubber 1 may have a suitable sectional shape defined by the orifice of the die a. The forward open end of the tubular body 4 is closed with a suitable cap on leaving the free end of the former B to prevent the water from flowing into the body while it is floating and traveling on the water bath 7.

The construction of the former B will be described below in detail.

Figure 2:
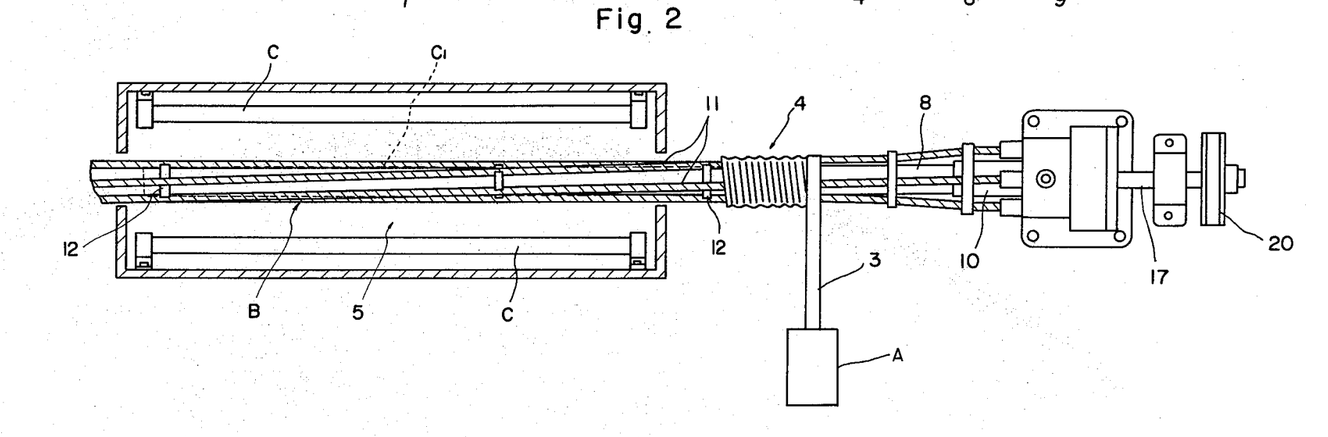
FIG. 2 is a plan view partly in horizontal section showing a principal part of FIG. 1.
Figure 4:
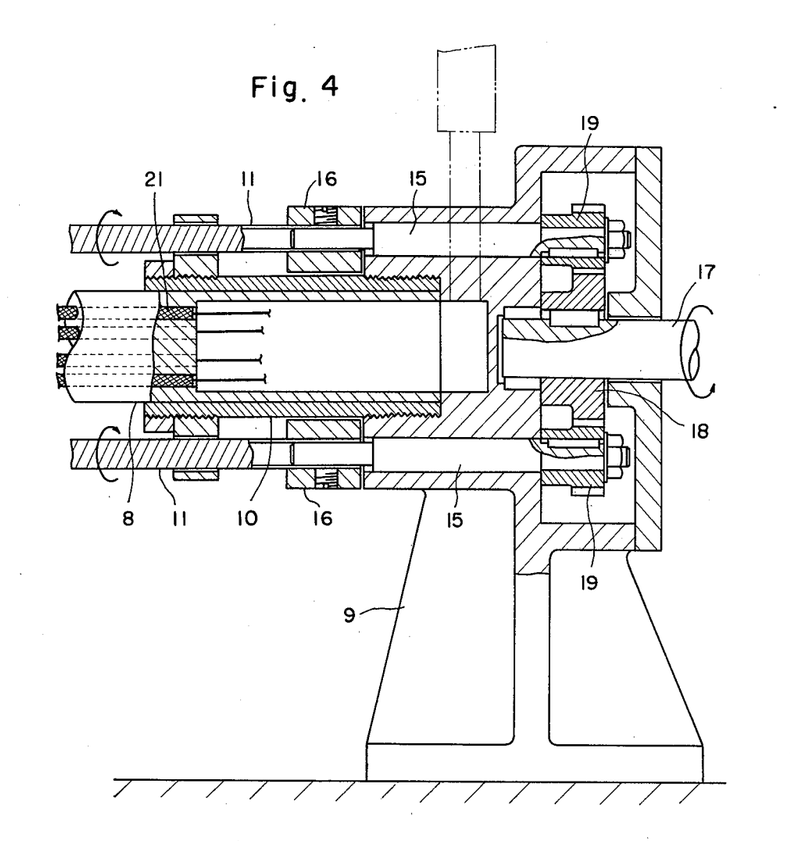
FIG. 4 is an enlarged front view in vertical section showing another principal part.

With reference to FIGS. 2 and 4, a metal core 8 having a high thermal conductivity is fixedly inserted at its one end to a sleeve 10 screwed to a frame 9 and is thereby supported in the manner of a cantilever. A plurality of feed rollers 11, supported by a plurality of retainers 12, are helically arranged around the metal core 8 with a large pitch and are in contact with an imaginary cylindrical face (i.e. the inner peripheral surface of the tubular body 4 to be produced) coaxial with the tubular body. The rollers 11 are rotatable in position each about its own axis.

Figure 5:
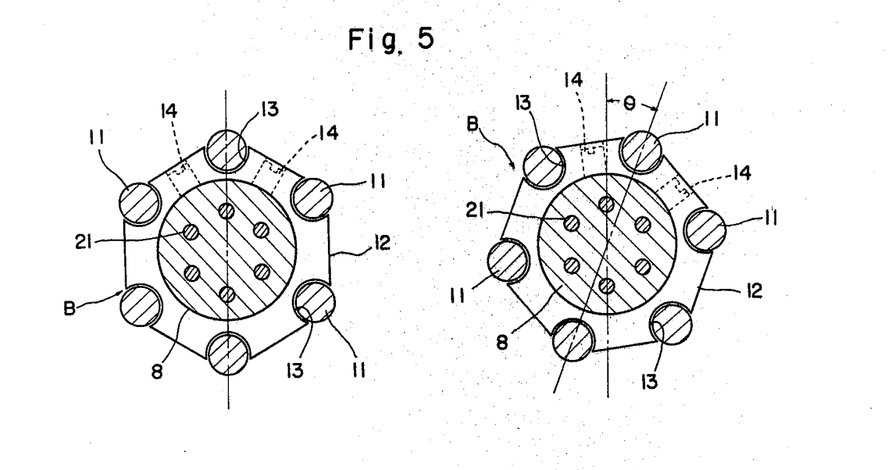

As seen in FIGS. 5 (A) and (B), the retainers 12 are polygonal and are each formed, in their peripheral portion, with recesses 13 rotatably receiving the feed rollers 11. The retainers 12, arranged from the supported end of the metal core 8 toward the free end thereof, are secured to the metal core 8 by bolts 14 with the phase of each retainer 12 displaced by a specified angle $\theta$ from retainer to retainer, whereby the helical pitch of the feed rollers 11 is settable as desired.

Figure 3:
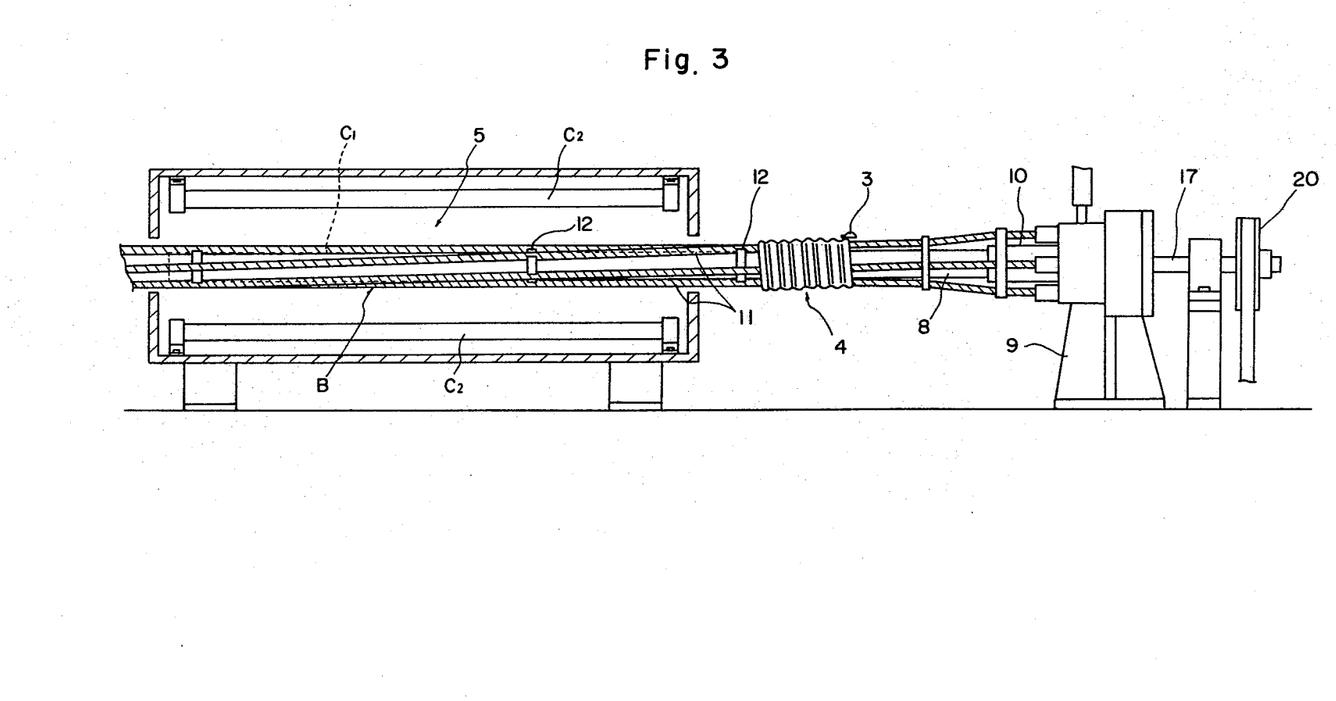
FIG. 3 is a front view partly in vertical section showing the principal part of FIG. 1.

Each of the feed rollers 11 is operatively connected at its base end to one end of a driven shaft 15 by a coupling 16. The driven shaft 15 extends through and is rotatably supported by the frame 9. Each driven shaft 15 has the other end fixedly carrying a pinion 19 meshing with a main gear 18 secured to a drive shaft 17. The input from a pulley 20 rotates the drive shaft 17 in one direction, thereby rotating the feed rollers 11 in the direction reverse to the direction of the helix thereof.

With reference to FIGS. 4 and 5 (A) and (B), the heating means $C_1$ incorporated in the former B comprises a nichrome wire heater 21 covered with an electric insulator and inserted into bores formed circumferentially equidistantly in the metal core 8.

According to the construction described above, the tubular body 4 on the former B is heated by the two heating means $C_1$ simultaneously from inside and outside, with the result that the tubular body 4 can be heated and vulcanized efficiently and uniformly in its entirety while being retained in shape against possible collapsing.

Particularly since the inner heating means $C_1$ is incorporated in the metal core 8 having a high thermal conductivity with the feed rollers 11 adapted to contact the inner peripheral surface of the tubular body 4, very high heating efficiency is attainable, consequently assuring highly efficient vulcanization.

The reinforced rubber hose produced by the above apparatus has outstanding resistance to oils and heat because the reinforcement 2 of rigid polyvinyl chloride resin is embedded in the rubber layer 1a. Moreover, the firm bond formed between the reinforcement 2 and the rubber layer 1a uniformly over the entire periphery of the reinforcement 2 effectively prevents separation therebetween even when the hose is subjected to repeated bending or deformation, thus assuring the reinforcing effect of the reinforcement 2 over a prolonged period of time.

Although the former B included in the foregoing embodiment is of such type that the helical feed rollers 11 are driven in the same direction to shape the strip 3 into a tubular body 4 while sending out the tubular body toward the free end, the former B may be of any type, insofar as the strip 3 can be helically wound into the tubular body 4 while sending the body toward the free end. For example, formers B of the following constructions are useful:

(a) A former B comprising at least two feed rollers 11 rotatable in the same direction and inclined in the same direction with respect to the axis of the tubular body 4 to be produced.

(b) A former B comprising rollers rotatable in the same direction and arranged on the same circumference in parallel to one another, and outer rollers having cam surfaces disposed close to the group of rollers or cams arranged at the base ends of the rollers successively displaced in the axial direction. A tubular body 4 is formed from a strip helically wound over the group of rollers and is forced toward the free end by the roller cam surfaces or by the cams.

(c) A former B comprising a plurality of rotatable shafts arranged around a tubular rotary shaft or on the same circumference, and a belt helically wound around the group of rotatable shafts, the belt having opposite ends connected together in the hollow portion of the tubular rotary shaft or in a hollow portion defined by the group of the rotatable shafts to provide an endless helical rotatable member. A strip 3, when helically wound on the rotatable member, is shaped into a tubular body 4 while being sent toward the free end.

(d) A former B comprising a plurality of rotatable shafts arranged on the same circumference in parallel to one another, and sleeves covering the shafts respectively and reciprocally slidable only axially thereof. A strip 3 is helically wound around the group of sleeves into a tubular body 4. Each of the sleeves comprises two divided semicylindrical segments such that the segments are slidable toward the free end when brought into contact with the inner surface of the tubular body 4, the sgements being also slidable in the reverse direction when brought away from the inner surface of the body 4. The tubular body 4 can be sent out toward the free end by the movement of the sleeves.

The heating means $C_1$ may also have any of various constructions suitable for the particular type of the former B used. For example, the nickrome wire heater 21 may be provided on the outer peripheral surface of the metal core 8 included in the foregoing embodiment. Alternatively, the metal core 8 may be formed with an oil passage through which a high-temperature oil heated outside the former B is circulated.

Irrespective of the type of the former B or of the heating means $C_1$ used, the outer heating means $C_2$ can be dispensed with depending on the construction, material, etc. of the hose to be produced.

Figure 7:
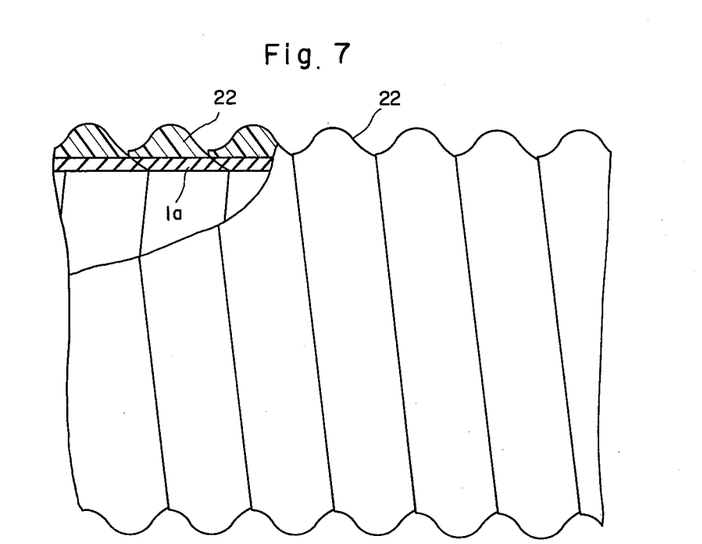
FIGS. 7 to 9 are front views showing finished hoses of different structures respectively, each hose being partly broken away to show the main part.

For example, FIG. 7 shows a flexible hose comprising a rubber layer 1a provided only on the inner side of the hose and an outer resin layer 22 as of soft polyvinyl chloride resin. The hose can be produced by extruding from the extruder A a strip composed of a soft resin portion and unvulcanized rubber intimately fused and bonded to the entire lower surface of the resin portion, helically winding the strip on the former B into a tubular body and simultaneously heating the tubular body from inside by the heating means $C_1$ within the former B for continuous vulcanization. This method ensures efficient vulcanization of the rubber layer 1a while minimizing the adverse influence on the soft resin layer 22 due to the heat.

Figure 8:
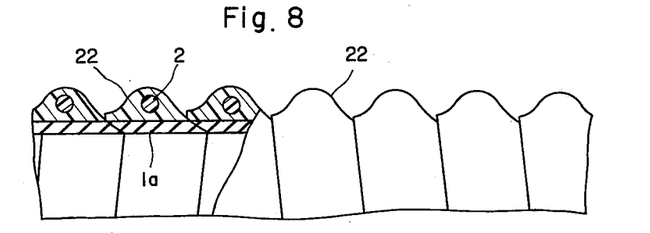

FIG. 8 shows the same hose as shown in FIG. 7 except that a reinforcement 2 of rigid polyvinyl chloride resin (or metal wire) is embedded in a soft resin layer 22. A rubber layer 1a is vulcanized from inside by the heating means $C_1$ in the former B.

Figure 9:
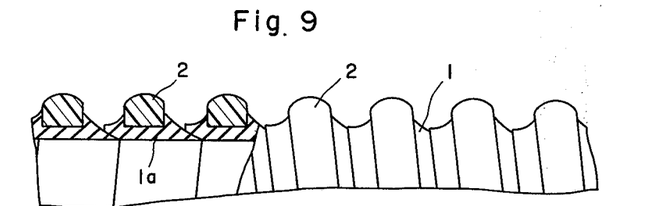

FIG. 9 shows a hose comprising a tubular portion in the form of a rubber layer 1a and a rigid resin reinforcement 2 provided helically around the tubular portion. This hose is produced by continuously extruding from the extruder A a strip composed of an unvulcanized rubber portion and a reinforcement 2 intimately fused and bonded to the top center part of the rubber portion, helically winding the strip on the former B into a tubular body with one side edge of the unvulcanized rubber portion overlapping the other side edge thereof, and heating and vulcanizing the tubular body from inside by the heating means $C_1$ in the former B.

Figure 10:
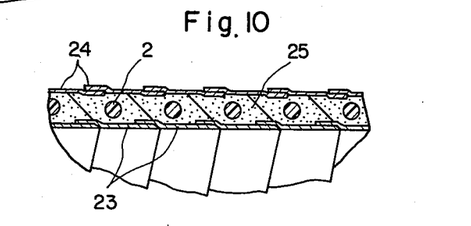
FIGS. 10 to 14 are enlarged front views in vertical section showing finished hoses of different structures respectively.

FIG. 10 shows a heat-insulating hose composed of inner and outer resin layers 23, 24 and a foamed resin layer 25 having a reinforcement 2 embedded therein. The hose is made by helically winding on the former B a strip for forming the layers 23, 24 and 25 into a tubular body, and heating the tubular body from inside by the heating means $C_1$ within the former B to foam the layer 25.

Rubber hoses of various structures can be produced by suitably selecting the extruder, the shape of the die orifice, the material to be embedded in rubber, the method of embedding, etc.

Figure 11:
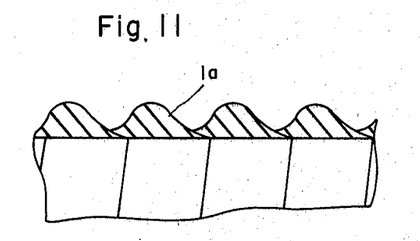
Figure 12:
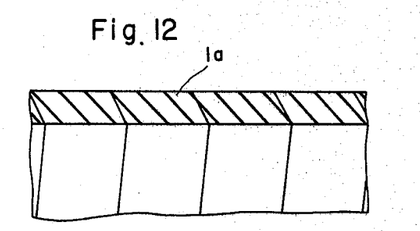
Figure 13:
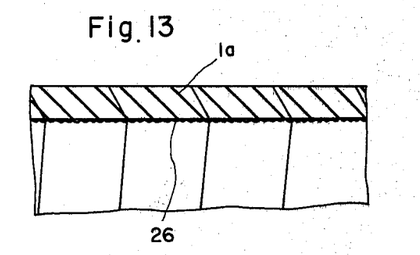
Figure 14:
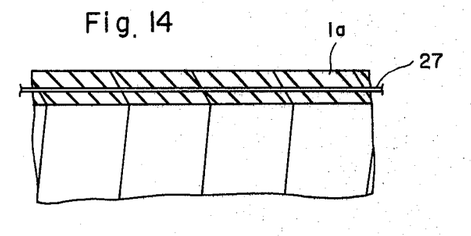
Figure 15:
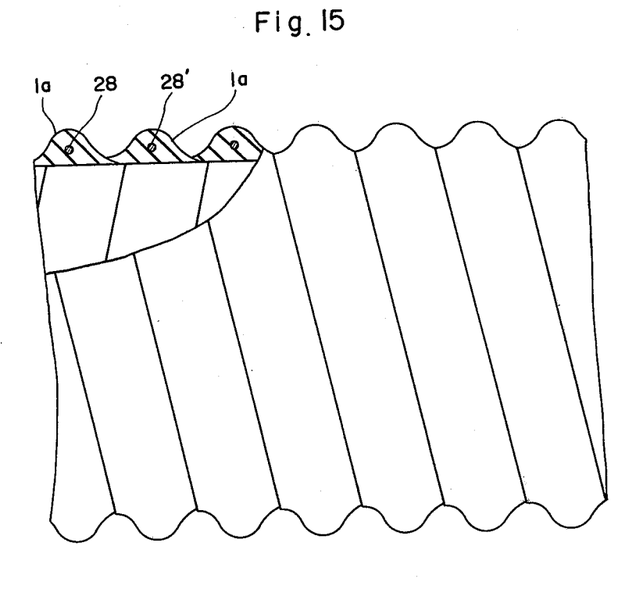
FIG. 15 is a front view partly broken away and showing a finished hose of another structure.

FIGS. 11 to 15 show typical examples of such hoses. FIGS. 11 and 12 show rubber hoses produced only from rubber 1a. FIG. 13 shows a rubber hose composed of rubber 1a lined with a helical fabric piece 26. FIG. 14 shows a rubber hose comprising rubber 1a and a string 27 embedded in a thick rubber portion and extending in parallel to the axis of the hose. FIG. 15 shows a rubber hose formed by double-pitch helical winding and incorporating two electric wires 28 and 28' embedded in thick portions of rubber 1a. Although not shown, a hose of multi-layered structure is produced by helically winding a plurality of strips with repeated heating, whereby the adjacent layers can be fused and bonded together with improved results. Further when a hose is formed from a resin strip having higher heat resistance in its inner layer than in the outer layer thereof, the strip is heat-treated from inside, whereby one edge of the strip can be fused and bonded to the other edge effectively. As a result, a hose can be produced from thermosetting resin strip.

What is claimed is:

1. An apparatus for continuously producing a tube comprising:
    a former (B) supported by a frame (9) in the manner of a cantilever for helically winding thereon a strip (3) of synthetic resin and unvulcanized rubber incorporating a vulcanizing agent to shape the strip (3) into a tubular body (4) and send the tubular body (4) toward a free end of said former (B),
    heating means (C1 and C2) for heat-treating the tubular body (4) to 170° C. to 220° C. during movement of said strip toward said free end,
    characterized in that said heating means (C1 and C2) are disposed at least inside and outside said former (B) extending along its length and constructed to heat the tubular body (4) from inside and outside to a temperature of from about 170° C. to about 220° C. for vulcanization thereof, said heating means comprising a nichrome wire heater (21) incorporated in a metal core (8) of the former (B),
    the former (B) including a plurality of feed rollers (11) helically arranged and retained by a plurality of retainers (12) secured to the metal core (8) and arranged from a supported end of the metal core toward a free end thereof,
    said retainers (12) being formed with recesses (13) for retaining said feed rollers (11) and are arranged from the supported end of the metal core (8) toward the free end thereof with the phase of each of the retainers (12) displaced by a specified angle ($\theta$) from retainer to retainer, the retainers being securable to the metal core in the displaced positions, whereby the helical pitch of the feed rollers (11) is freely determinable, and
    a cooling water nozzle (6) disposed on one side of the heating means (C1) toward which the tubular body (4) is sent out to thereby cool the tubular body (4) immediately after the vulcanization heat treatment.

2. The invention of claim 1 wherein said retainers are polygonal.

3. The invention of claim 1 wherein said retainers are polygonal and said recesses are disposed along corners of said polygonal retainers.

4. The invention of claim 1 wherein said nichrome wire heater has an electric insulator covering the nichrome wire heater and a plurality of nichrome wire heaters being disposed circumferentially equidistantly in and inserted into bores formed in said metal core.

5. The invention of claim 1 wherein said plurality of feed rollers are adapted to contact an inner peripheral surface of said tubular body whereby sufficiently high heating efficiency is attainable and achieving highly efficient vulcanization.

6. The invention of claim 1 wherein said plurality of feed rollers are adapted to contact an inner peripheral surface of said tubular body whereby a reinforced rubber hose is produced having outstanding resistance to oils and heat by a rigid polyvinyl chloride resin reinforcement embedded in the rubber layer forming a firm bond between said reinforcement and the rubber layer uniformly over the entire periphery and effectively preventing separation therebetween when the hose is subjected to repeated bending and deformation over a prolonged period of time.

7. The invention of claim 1 wherein at least two of said plurality of feed rollers are rotatable in the same direction and inclined in the same direction with respect to the axis of the tubular body being produced.

8. The invention of claim 1 wherein said plurality of feed rollers are rotatable in the same direction and arranged on the same circumference in parallel to one another, and outer rollers having cam surfaces disposed close to a group of said rollers or cam surfaces arranged at base ends of the rollers successively displaced in the axial direction.

9. The invention of claim 8 wherein said strip is helically wound over said group of said rollers and is forced toward the free end by the roller cam surfaces or by the cam surfaces.

10. The invention of claim 1 wherein a plurality of rotatable shafts are arranged around a tubular rotary shaft or on the same circumference, and a belt helically wound around the group of rotatable shafts, the belt having opposite ends connected together in the hollow portion of the tubular rotary shaft or in a hollow portion defined by the group of the rotatable shafts to provide an endless helical rotatable member forming said strip, when helically wound on the rotatable member said tubular body being sent toward the free end.

11. The invention of claim 1 wherein a plurality of rotatable shafts are arranged on a same circumference in parallel to one another, and sleeves covering the shafts are respectively and reciprocally slidable only axially thereof.

12. The invention of claim 1 wherein said strip is helically wound around the group of sleeves into a tubular body, each of the sleeves comprising two divided semicylindrical segments being slidable toward the free end when brought into contact with the inner surface of the tubular body, the segments being also slidable in the reverse direction when brought away from the inner surface of the body.

13. The invention of claim 1 wherein said heating means has the nichrome wire heater provided on the outer peripheral surface of the metal core, said metal core formed with an oil passage through which a high-temperature oil heated outside the former is circulated.

14. The invention of claim 1 wherein said reinforcement of rigid polyvinyl chloride resin and metal wire is embedded in a soft resin layer and a rubber layer being vulcanized from inside by the heating means in the former.

15. The invention of claim 1 wherein said tube is in the form of a rubber layer and a rigid resin reinforcement is provided helically around the tubular portion forming a hose produced by continuously extruding from the extruder a strip composed of an unvulcanized rubber portion and a reinforcement intimately fused and bonded to the top center part of the rubber portion, helically winding the strip on the former into a tubular body with one side edge of the unvulcanized rubber portion overlapping the other side edge thereof, and heating and vulcanizing the tubular body from inside by the heating means in the former.

16. The invention of claim 1 wherein said tube is comprised of inner and outer resin layers, a foamed resin layer 25 having a reinforcement embedded therein, the tube being made by helically winding on the former said strip for forming the layers into a tubular body, and heating the tubular body from inside by the heating means within the former B to foam the layer.

17. The invention of claim 1 wherein when a hose is formed from said resin strip having higher heat resistance in its inner layer than in the outer layer thereof, the strip is heat-treated from inside, whereby one edge of the strip can be fused and bonded to the other edge effectively.

* * * * *